United States Patent
Syngal et al.

(10) Patent No.: US 10,337,553 B2
(45) Date of Patent: Jul. 2, 2019

(54) SPRING-LOADED CABLE ATTACHMENT

(71) Applicant: Ford Global Technologies, LLC, Dearborn, MI (US)

(72) Inventors: Nikunj Syngal, Farmington Hills, MI (US); Dennis Bashur, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 15/484,624

(22) Filed: Apr. 11, 2017

(65) Prior Publication Data

US 2018/0291948 A1    Oct. 11, 2018

(51) Int. Cl.
  *F16C 1/14*    (2006.01)
  *F16C 1/22*    (2006.01)
  *F16H 61/36*   (2006.01)

(52) U.S. Cl.
  CPC .............. *F16C 1/223* (2013.01); *F16H 61/36* (2013.01); *F16C 1/14* (2013.01)

(58) Field of Classification Search
  CPC .............. F16C 1/223; F16C 1/14; F16H 61/36
  See application file for complete search history.

(56) References Cited

U.S. PATENT DOCUMENTS

| | | | | |
|---|---|---|---|---|
| 5,570,612 A | * | 11/1996 | Reasoner | F16C 1/14 74/501.5 R |
| 5,673,596 A | * | 10/1997 | Lu | F16C 1/14 74/502.4 |
| 5,709,132 A | * | 1/1998 | Irish | F16C 1/14 74/501.5 R |
| 5,911,791 A | * | 6/1999 | Srinivas | F16C 1/14 74/501.5 R |
| 6,994,650 B2 | | 2/2006 | Allen et al. | |
| 9,004,254 B2 | | 4/2015 | Jang et al. | |
| 9,062,752 B2 | | 6/2015 | Fournier | |

FOREIGN PATENT DOCUMENTS

WO    2016169605 A1    10/2016

* cited by examiner

*Primary Examiner* — Vicky A Johnson
(74) *Attorney, Agent, or Firm* — David Kelley; Brooks Kushman P.C.

(57) ABSTRACT

An attachment assembly for securing a transmission shifter cable includes an outer frame and an inner frame disposed at least partially within the outer frame and axially movable relative to the outer frame. The attachment assembly further includes an attachment block disposed at least partially within the inner frame and axially movable relative to the inner frame. An axial displacement of the attachment block secures the inner frame to the outer frame to inhibit axial movement of the inner frame relative to the outer frame.

17 Claims, 3 Drawing Sheets

SPRING-LOADED CABLE ATTACHMENT

TECHNICAL FIELD

This disclosure relates generally to a transmission attachment assembly, and more particularly to a spring-loaded attachment assembly for securing a shifter cable to an outer manual lever of an automatic transmission.

BACKGROUND

In a conventional automatic transmission system for a motor vehicle, a direct mechanical linkage connects a driver-operated gear shift lever through a cable to a gear shift mechanism on the transmission. The gear shift operation within automatic transmission systems may be facilitated manually, through a shift lever coupled to the transmission system through a shifter cable. The shifter can be moved manually between parking, drive, neutral, and reverse positions.

For transmission systems that employ shifters, a problem can arise when coupling the shifter cable to the transmission. The transmission generally has an outer lever to which the shifter cable may be attached. In some instances, an installer may have difficulty determining whether the shifter cable has been properly secured to the outer lever.

SUMMARY

A vehicle includes a transmission having an outer manual lever that includes a lever pin. The vehicle further includes a shifter cable and an attachment assembly adapted to secure the shifter cable to the lever pin. The attachment assembly includes an outer frame and an inner frame disposed at least partially within the outer frame and adjustable in an axial direction relative to the outer frame. The inner frame includes a spring extending within the inner frame. The inner frame defines a retention block including a retention wall. The attachment assembly further includes an attachment block disposed at least partially within the inner frame in engagement with the spring.

The attachment block further includes a flexible arm that defines a protruding latch. The flexible arm may define a lower contact surface adapted to engage the lever pin of the outer manual lever. In some approaches, engagement of lever pin with the lower contact surface effects displacement of the flexible arm in a direction orthogonal to the axial direction.

The attachment block is axially displaceable relative to the inner frame between a disengaged configuration and an engaged configuration. In the disengaged configuration, the spring biases the flexible arm into contact with the retention block such that the latch is disposed at a first side of the retention wall. In the engaged configuration, the attachment block is axially displaced in a direction of the retention block such that the latch is disposed at a second side of the retention wall opposite the first side.

The attachment block may further include a bottom wall defining a retention slot. For example, the retention slot may be a U-shaped retention slot. In the engaged configuration, at least a portion of the lever pin engages the retention slot. For example, in the engaged configuration, the U-shaped retention slot may be adapted to engage at least 25% of an outer perimeter of a cross-section of a neck portion of the lever pin.

The lever pin may include a head portion having a greater diameter than the neck portion. In the engaged configuration, the head portion may be disposed between the bottom wall of the attachment block and the flexible arm of the attachment block.

In some approaches, the retention block defines an engagement wall. The engagement wall may define a geometry complementary to a geometry of a head portion of the lever pin. The head portion of the lever pin may engage the engagement wall in the engaged configuration.

In another approach, a method for securing a transmission shifter cable includes, at an attachment assembly, axially displacing an inner frame relative to an outer frame. Axially displacing the inner frame may include displacing at least one protrusion disposed on at least one arm of the inner frame relative to at least one depression formed in an inner wall of the outer frame.

The method further includes contacting an attachment block disposed within the inner frame with a transmission lever to deflect an attachment block arm. Contacting the attachment block may include contacting a lower contact surface of a flexible arm of the attachment block with a head portion of a pin of the transmission lever to deflect the flexible arm in a first direction orthogonal to axial displacement of the attachment block.

In response, the method includes axially displacing the attachment block from a first axial position to a second axial position to engage the transmission lever and to lock the inner frame to the outer frame. Axially displacing the attachment block may include, at a spring disposed between the inner frame and the attachment block, biasing the attachment block to axially displace the attachment block. In one approach, axially displacing the attachment block to the second axial position may engage the attachment block with the at least one arm to lock the inner frame to the outer frame. In response to axially displacing the attachment block to the second axial position, the flexible arm may be adapted to retract in a second direction opposite the first direction.

An attachment assembly for securing a transmission shifter cable includes an outer frame and an inner frame disposed at least partially within the outer frame and axially movable relative to the outer frame. The attachment assembly further includes an attachment block disposed at least partially within the inner frame and axially movable relative to the inner frame. An axial displacement of the attachment block secures the inner frame to the outer frame to inhibit axial movement of the inner frame relative to the outer frame.

The inner frame may further include a guide pin extending from an inner wall of the inner frame. The attachment block may include an aperture disposed through a rear wall of the attachment block. The guide pin may be disposed through the aperture. A spring may be disposed about the guide pin between the inner wall and the attachment block to bias the attachment block in an axial direction.

In one approach, the attachment block includes at least one side rail, and an inner wall of the inner frame includes at least one side guide adapted to receive the at least one side rail to permit movement of the attachment block in an axial direction.

The attachment block may include a flexible arm defining a latch protruding from the flexible arm. The inner block may include a retention block defining a retention wall. The axial displacement of the attachment block may effect engagement of the latch with the retention wall.

In another approach, the inner frame includes at least one arm having at least one protrusion extending therefrom, and the outer frame includes at least one inner wall defining at least one depression formed therein. The at least one depression is adapted to receive the at least one protrusion.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
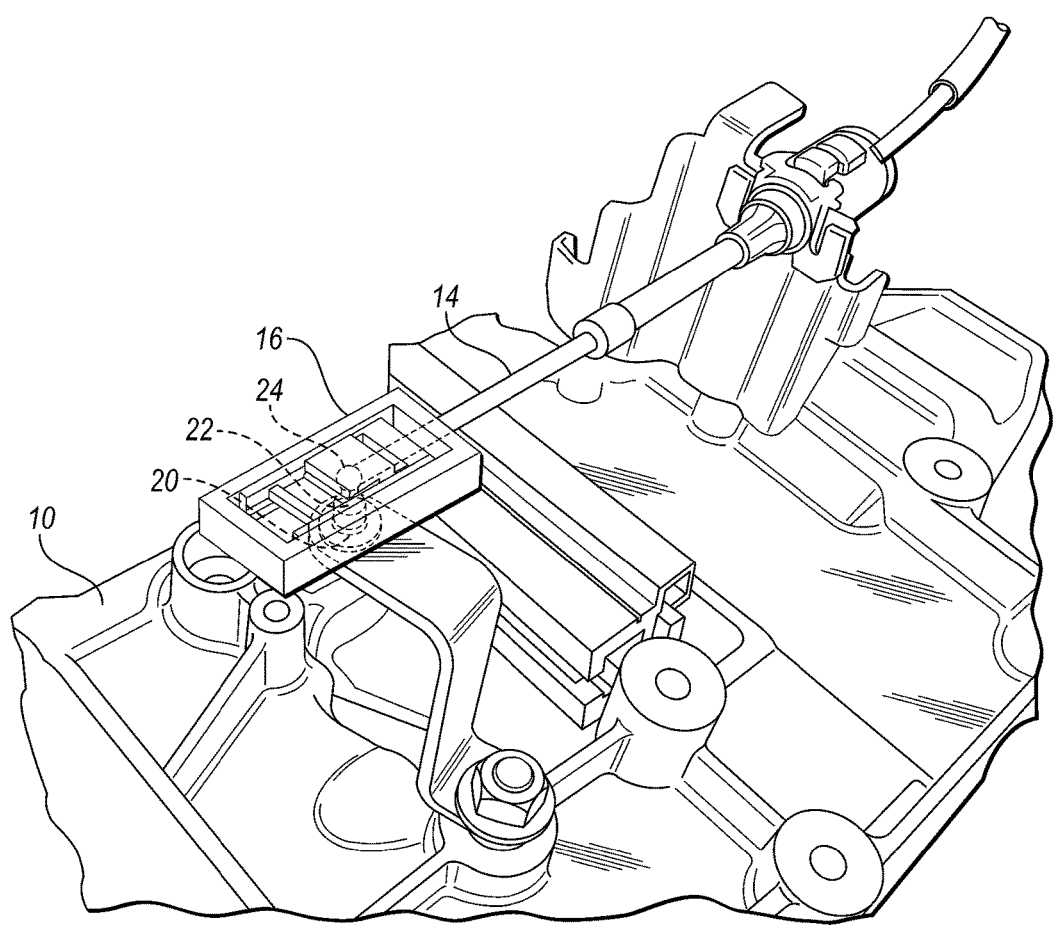
FIG. 1 is an illustration of an example of a transmission cable attachment system.

Referring now to FIG. 1, a transmission 10 includes an outer manual lever 12, a shifter cable 14, and an attachment assembly 16 for attaching the shifter cable 14 to the outer manual lever 18. In one approach, the attachment assembly 16 may be attached to a protruding pin 20 of the outer manual lever 12. The pin 20 may include a pin neck 22 and a pin head 24 attached to the pin neck 22. In a preferred approach, the pin neck 22 has a rounded geometry in the horizontal cross-sectional direction, and the pin head 24 has a tapered geometry in the vertical cross-sectional direction. For example, the pin head 24 may be a frustoconically-shaped pin head, or may be a spherical pin head. Other shapes and configurations are contemplated.

Figure 2:
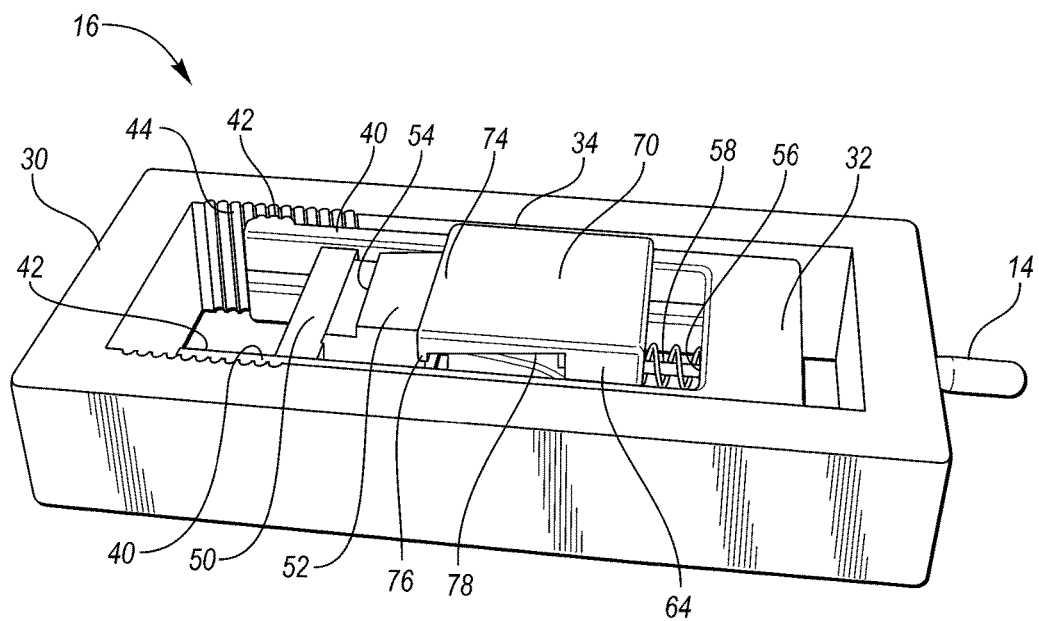
FIG. 2 is a perspective view of an attachment assembly in a first configuration.
Figure 3:
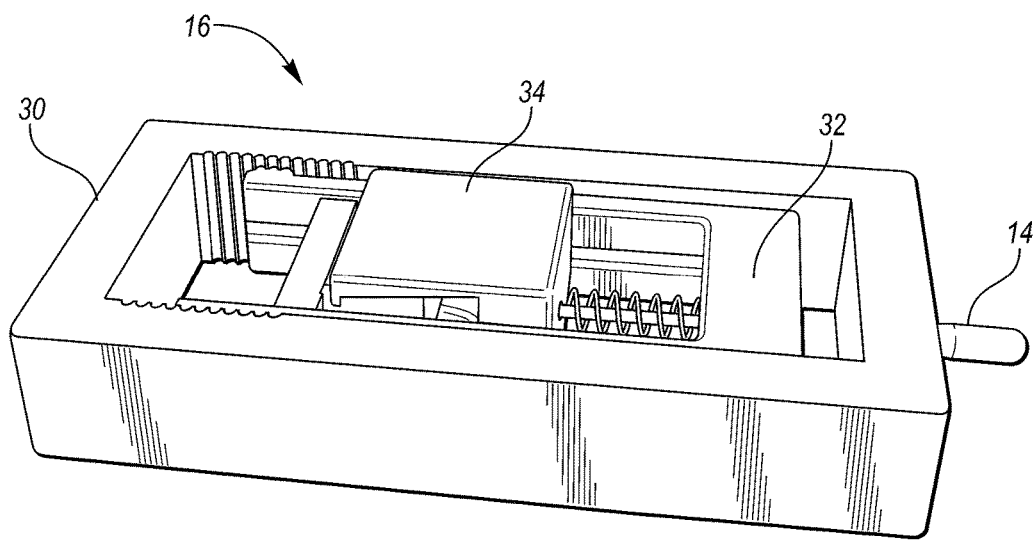
FIG. 3 is a perspective view of an attachment assembly in a second configuration.

As will be appreciated, the attachment assembly 16 may be moved between a disengaged configuration, shown for example in FIG. 2, and an engaged configuration, shown for example in FIG. 3. In the engaged configuration, for example, the attachment assembly 16 may be attached to the pin 20 such that the attachment assembly 16 engages the pin neck 22, and the pin head 24 is disposed in a cavity of the attachment assembly 16.

Referring now to FIG. 2, the attachment assembly 16 includes an outer frame 30, an inner frame 32 axially moveable relative to the outer frame 30, and an attachment block 34 axially movable relative to the inner frame 32 and the outer frame 30. The outer frame 30, the inner frame 32, and the attachment block 34 may be formed of any suitable material. In one example, one or more of the components may be formed of plastic. In another example, one or more of the components may be formed of nylon 6/6 with 33% glass fiber filling.

The outer frame 30 may be secured to the shifter cable 14 using any suitable approach. For example, the outer frame 30 may be secured to the shifter cable 14 through overmolding.

The inner frame 32 is secured at least partially within a cavity of the outer frame 30. For example, outer walls of the inner frame 32 may be provided with one or more protrusions or rails that cooperate with one or more recesses or channels disposed in inner walls of the outer frame 30. In another example, outer walls of the inner frame 32 are provided with one or more recesses or channels that cooperate with one or more protrusions or rails disposed on inner walls of the outer frame.

The inner frame 32 may be provided with arms 40 that cooperate with inner walls of the outer frame 30. In one example, shown in FIG. 2, outer walls of the arms 40 may include one or more protrusions or teeth 42 that engage corresponding recesses 44 on the inner walls of the outer frame 30. In another example (not shown), the inner walls of the outer frame include one or more protrusions or teeth that engage corresponding recesses on the outer walls of the arms. The arms 40 are preferably sufficiently flexible such that inward flex of the arms 40 permits selective engagement and disengagement of teeth with opposing recesses.

In this way, the inner frame 32 may be axially and incrementally displaced relative to the outer frame 30. The inner frame 32 may be axially displaced, for example, to better align the attachment block 34 with the pin 20 of an outer manual lever 12. In this way, variances in shifter cable assemblies and/or in outer manual lever pin position may be accounted for during assembly of the transmission components. For example, the cooperation of the arms 40 of the inner frame 32 with inner walls of the outer frame 30 may permit a user to adjust the inner frame 32 along a range of approximately 14 millimeters (e.g., +/−seven millimeters) within the inner cavity defined by the outer frame 30.

Axially displacement of the inner frame 32 relative to the outer frame 30 may aid in synchronizing of the shifter in the vehicle to the shifting mechanism on the transmission 10 (facilitated by the outer manual lever 12). For example, inconsistencies that may have been caused by manufacturing variability between the vehicle shifter and the shifting mechanism on the transmission 10 may be obviated through the axial adjustment of the inner frame 32 relative to the outer frame 30.

Figure 4:
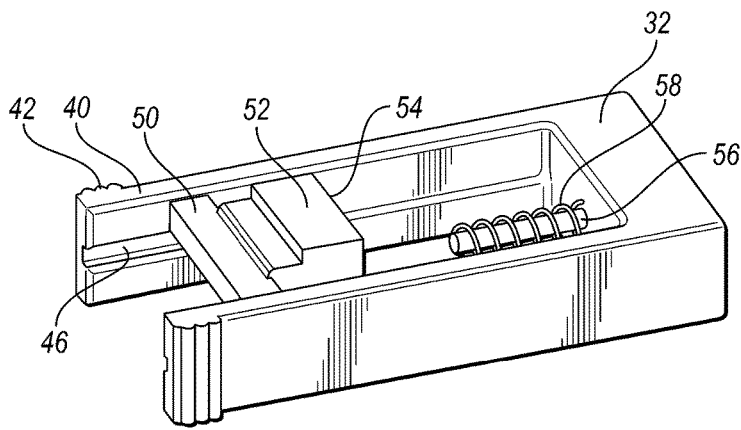
FIG. 4 is a perspective view of an inner frame of an attachment assembly.

Referring now to FIG. 4, the inner frame 32 may include tracks 46 extending along inner walls of the arms 40 of the inner frame 32. In the approach shown, the tracks 46 may protrude into inner walls of the arms 40 of the inner frame 32. In this approach, the tracks 46 may receive side rails of the attachment block 34 to guide movement of the attachment block 34 in the axial direction. In another approach, the tracks may be outwardly-protruding rails sized, for example, to be received in corresponding tracks disposed in the attachment block.

The inner frame 32 may also include a central brace 50 extending between the arms 40. The inner frame 32 may further include a retention body 52. The retention body 52 may be secured to, or integrally formed with, the central brace 50. In a preferred approach, lateral sides of the retention body 52 are spaced from the arms 40 of the inner frame 32 so as to permit a side wall members of the attachment block 34 to pass between the retention body 52 and the arms 40 of the inner frame 32.

The retention body 52 includes a retention wall 54. The retention wall 54 may be a vertical, may be sloped in a first direction (e.g., toward the attachment block 34), or may be sloped in a second direction opposite the first direction (e.g., away from the attachment block 34). Other geometries of the retention wall 54 are contemplated. As will be appreciated, when the attachment assembly 16 is in the engaged configuration, the retention wall 54 interfaces with a portion of the attachment block 34 to inhibit movement of the attachment block 34 in the direction of the shifter cable 14.

The inner frame 32 may also include a guide pin 56 extending into a central cavity of the inner frame 32. A spring 58 is secured to an inner wall of the inner frame 32 and is disposed such that coils of the spring 58 surround the guide pin 56. The guide pin 56 and the spring 58 may be formed of stainless steel.

Figure 5:
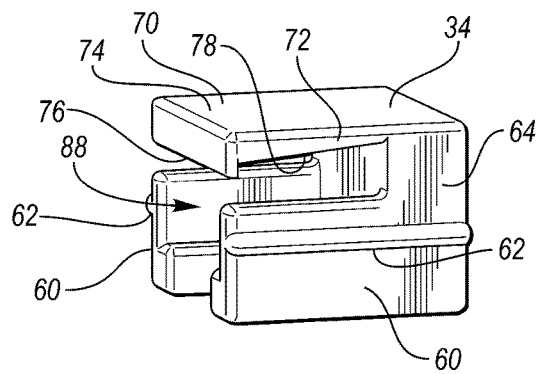
FIG. 5 is a perspective view of an attachment block of an attachment assembly.

Referring now to FIG. 5, the attachment block 34 includes side wall members 60 having one or more side rails 62. The side rails 62 may be dimensioned so as to be received within the tracks 46 of the inner walls of the arms 40 of the inner frame 32. A rear wall 64 extends between the side wall members 60.

The attachment block 34 further includes a top wall 70. The top wall 70 may extend, for example, from the rear wall 64 of the attachment block 34. The top wall 70 is preferably dimensioned to define a first top wall region 72 defining a first thickness, a second top wall region 74 having a protruding ridge or latch 76 defining a second thickness, and a contact surface 78 extending between the first top wall region 72 and the latch 76. The second thickness of the latch 76 is preferably greater than the first thickness of the first top wall region 72. The contact surface 78 may be, for example, a sloped contact surface, or may be a flat surface extending between the first top wall region 72 and the latch 76. In this way, upon receiving a contact (e.g., from pin 20), the top wall 70 may flex about the first top wall region 72. That is, the latch 76 may be rotatable about a pivot axis located at or near the first top wall region 72. In this way, the top wall region 72 may be referred to as a flexible arm.

Figure 6:
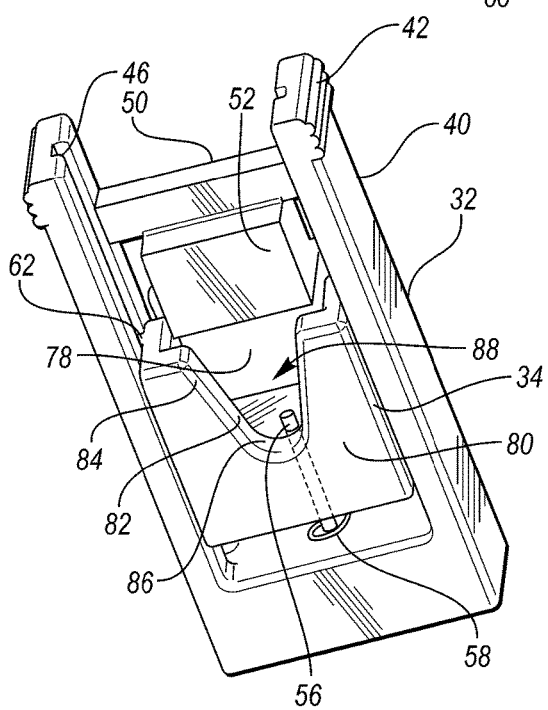
FIG. 6 is a perspective view of an inner frame and an attachment block of an attachment assembly.

Referring now to FIG. 6, the attachment block 34 may further include a bottom wall 80. The bottom wall 80 preferably includes vertical bottom walls 82 that define an aperture through the bottom wall 80. As shown, the vertical bottom walls 82 may define a "U"-shaped aperture having a wide aperture region 84 and a narrower aperture region 86.

In this way, the bottom wall 80, the side wall members 60, the rear wall 64, and the top wall 70 of the attachment block 34 form a pin cavity 88 dimensioned to receive at least a portion of a pin (e.g., pin 20).

As show in FIG. 6, the attachment block 34 may be disposed between arms 40 of the inner frame 32. For example, the attachment block 34 may be disposed such that side rails 62 of the attachment block 34 are disposed within the tracks 46 of the inner frame 32. The bottom wall 80 of the attachment block 34 is disposed such that an upper surface of the bottom wall 80 is below a lower surface of the retention body 52. Furthermore, the guide pin 56 of the inner frame 32 may be disposed through an aperture through the rear wall 64 of the attachment block 34. The spring 58 may be pressed against a rear surface of the rear wall 64 of the attachment block 34 to bias the attachment block 34 in the direction of the central brace 50 of the inner frame 32.

Referring again to FIG. 2, in the disengaged configuration, the spring 58 biases the attachment block 34 against the inner frame 32. More particularly, the spring 58 biases the latch 76 of the top wall 70 of the attachment block 34 against a rear wall of the retention body 52 of the inner frame 32. The rear wall of the retention body 52 may be referred to as an engagement wall of the retention body 52. In this configuration, the alignment of the latch 76 with the rear wall is such that the engagement wall inhibits axial movement of the attachment block 34 in the direction urged by the spring 58. As such, the latch 76 is maintained at a first side of the retention wall 54.

To secure the shifter cable 14 to the outer manual lever 12, a user places the attachment assembly 16 over the pin 20. As discussed, the inner frame 32 may cooperate with the outer frame 30 to permit a user to adjust the inner frame 32 relative to the outer frame 30. More particularly, the user adjusts the attachment assembly 16 such that the user is able to place the attachment block 34 over the pin 20. In doing so, the pin head 24 enters the pin cavity 88 formed by the attachment block 34 and the engagement wall of the retention block 52.

A downward force on the attachment assembly 16 causes the pin 20 to engage the contact surface 78 of the top wall 70 and drive the latch 76 of the top wall 70 upward and out of axial alignment with the engagement wall of the retention block 52 of the inner frame 32. With latch 76 disposed out of axial alignment with the engagement wall of the retention block 52, the compressive force of the spring 58 on the rear wall 64 of the attachment block 34 causes the attachment block 34 to be driven axially in the direction of the retention block 52. As the attachment block 34 is driven in the axial direction, the pin 20 moves from engagement with the second top wall region 74 to engagement with the first top wall region 72, which has a thickness less than that of the second top wall region 74.

Upon sufficient axial movement of the attachment block 34, the latch 76 clears the retention wall 54 and deflects back to the original alignment. Axial movement in the opposite direction is substantially inhibited by the engagement of the latch 76 and the retention wall 54. The vertical bottom walls 82 of the bottom wall 80 of the attachment block 34 preferably engage the walls of the pin neck 22. For example, the vertical bottom walls 82 of the bottom wall 80 may engage the pin neck 22 along approximately between 25% to 50% of the circumference of the pin neck 22. The pin head 24 is secured above the narrower aperture region 86, which has a smaller cross-sectional geometry than that of the pin head 24.

In the engaged configuration, the pin head 24 engages the engagement wall of the retention block 52. In one approach, the engagement wall of the retention block 52 may be provided with a geometry that complements the geometry of the pin head 24. For example, if the pin head 24 is a frustoconical pin head having a sloped side wall, the engagement wall of the retention block 52 may be a sloped engagement wall having a slope corresponding to that of the frustoconical pin head. Similarly, if the pin head 24 is spherical, the engagement wall of the retention block 52 may be a curved engagement wall having a radius of curvature corresponding to that of the spherical pin head.

In the engaged configuration, the attachment block 34 is axially displaced in a direction of the retention block 52 such that the latch 76 is disposed at a second side of the retention wall 54 opposite the first side. In this way, in the engaged configuration, the pin 20 of the outer manual lever 12 is secured in the pin cavity 88 formed by the attachment block 34 and the engagement wall of the retention block 52.

Axial movement of the attachment block 34 into the engaged configuration performs the additional function of locking the arms 40 of the inner frame 32 into engagement with the inner walls of the outer frame 30. More particularly, the protrusions or teeth 42 of the arms 40 are locked into engagement with the corresponding recesses 44 on the inner walls of the outer frame 30. The locking may be performed by one or more portions of the attachment block 34 pressing against inner walls of the arms 40. For example, in the engaged configuration, side wall members 60 of the attachment block 34 may bias the arms 40 into a locked position, or prevent the arms 40 from flexing to an unlocked position. When the inner frame 32 is locked with respect to the outer frame 30, axial movement of the inner frame 32 with respect to the outer frame 30 is substantially inhibited.

In this way, the attachment assembly 16 described herein may perform two functions when securing a shifter cable 14 to an outer manual lever 12 of a transmission 10. First, the spring-loaded action causes the pin 20 of the outer manual lever 12 to be secured within the attachment assembly 16. Second, the axial movement of the attachment block 34 biases arms 40 of the inner frame 32 against the outer frame 30. Such biasing preferably locks the inner frame 32 relative to the outer frame 30 (i.e., axial movement of the inner frame 32 relative to the outer frame 30 is substantially inhibited). By performing the additional locking step, the attachment assembly 16 therefore automatically performs an assembly step that may otherwise require manual user actuation.

The attachment assembly 16 may provide the additional advantage of reducing the user force required to attach a shifter cable 14 to a transmission outer manual lever 12, as compared to previous approaches. This advantage may be achieved, for example, through forming the top wall region 70 from a flexible material. The advantage may also be achieved, through forming the geometry of the top wall region 70 such that the second top wall region 74 may flex relative to the first top wall region 72. For example, a thickness of the first top wall region 72 may be sufficiently narrow to provide the desired flex of the second top wall region 74.

The attachment assembly 16 may also provide user feedback indicative of the attachment assembly 16 being in the disengaged configuration, and/or indicative of the attachment assembly 16 being in the engaged configuration.

The attachment block 34 may provide a user with a visual indication that the attachment assembly 16 is in the engaged configuration of FIG. 3 (e.g, that the pin 20 is secured within the attachment assembly 16). For example, at least a portion of the top surface of the retention wall 54 portion of the retention block 52 may be provided with a visual indicator that is visually discernable by a user. The visual indicator may be a distinctive color, a color coating, a color pattern, a symbol or icon, or other visual indicator.

For example, the top surface may be provided with a red indicator (e.g., a colorant coating or symbol). In this way, when the user sees the red indicator, the user may be informed that the attachment block 34 is not fully in the engaged configuration. Conversely, when the user no longer sees the red indicator (e.g., after engaging the contact surface 78 with the pin head 24), the user may be informed that the attachment block 34 is fully in the engaged configuration.

In another approach, at least a portion of a top surface of the top wall 70 of the attachment block 34 may be provided with a visual indicator. In still another approach, at least a portion of both the top surface of the retention wall 54 of the retention block 52 and the top surface of the top wall 70 of the attachment block 34 may be provided with a visual indicator.

In one approach, the attachment assembly 16 is provided with a cover. The cover may extend between opposing side walls of the outer frame 30, or may extend between opposing side walls of the inner frame 32. The cover is preferably translucent or opaque, and preferably covers the attachment block 34 when the attachment assembly 16 is in the disengaged configuration. In this way, a user may be provided with two distinct visual indicators indicative of a configuration of the attachment assembly. For example, the top surface of the retention wall 54 of the retention block 52 may be provided with a first visual indicator (e.g., a red indicator), and the top surface of the top wall 70 of the attachment block 34 may be provided with a second visual indicator different than that of the first visual indicator (e.g., a green indicator). In this way, when the user sees the red indicator on the top surface of the retention wall 54 of the retention block 52, the user may be informed that the attachment block 34 is not fully in the engaged configuration. Conversely, when the user sees the green indicator on the top surface of the top wall 70 of the attachment block 34 (e.g., after engaging the contact surface 78 with the pin head 24), the user may be informed that the attachment block 34 is fully in the engaged configuration.

The attachment block 34 may also provide a user with an audible indication that the attachment assembly 16 is in the engaged configuration of FIG. 3 (e.g., that the pin 20 is secured within the attachment assembly 16). In a preferred approach, sudden contact of the latch 76 with a surface of the retention body 52 effects an audible reaction. For example, the latch 76 may provide an audible "snap" when it engages the retention body 52, indicating that it has fully cleared the retention wall 54. In this way, a user is provided with an audible indication that the attachment assembly 16 is in the engaged configuration of FIG. 3 (e.g, that the pin 20 is secured within the attachment assembly 16).

The attachment assembly 16 described herein may be implemented in various transmission configurations. For example, the attachment assembly 16 may be implemented in a shift-by-wire transmission. A shift-by-wire transmission refers to an arrangement having no mechanical connection between a transmission control device and the transmission. Instead, a user-operated gear shift module transmits an electrical signal to an electronic controller, which directs separate actuators to apply or release the various friction elements, such as clutches or brakes, to obtain a desired gear ratio. In some approaches, the transmission may be provided with a parking pawl that is operated by one of the actuators. The parking pawl may engage with at least one gear in the transmission to inhibit vehicle motion or release from the at least one gear to permit vehicle motion. The parking pawl may be engaged in response to a driver shifting the transmission to PARK. Of course, various other parking elements may also be used to inhibit vehicle motion, such as a parking brake.

In some configurations, the actuators operating the friction elements and parking pawl are hydraulic actuators. Under normal vehicle operation, an engine drives a transmission pump to supply hydraulic pressure to the actuators and enable application or release of the friction elements or parking brake. Because there is not a mechanical connection between the gear shift module and the transmission, in the absence of hydraulic pressure to the actuators, a driver will be unable to shift the transmission from Park to other gears. When the engine is off, the gear shift module may not be usable to shift gears. Under some circumstances, however, it may be desirable to shift the vehicle from PARK to another gear without the engine running. For example, if the engine is inoperable, it may be desirable to shift the transmission out of PARK to facilitate towing. As an additional example, it may be desirable to roll the vehicle to a new location without running the engine. Using the standard gear shift module, shifting out of PARK without operating the engine is not possible. Consequently, the transmissions may be provided with a manual override mechanism. This may include a mechanism available under the vehicle hood or a cable mechanism available within the cabin. Such solutions may be difficult for a user to access, difficult to route through a vehicle, and also add complexity and cost to the vehicle. In addition, known override mechanisms that are accessible under the vehicle hood include an external override lever that moves during normal transmission operation. Such external moving parts are susceptible to mud, snow, ice, or other debris accumulating and inhibiting transmission operation.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle, comprising:
    a transmission having an outer manual lever including a lever pin;
    a shifter cable; and
    an attachment assembly adapted to secure the shifter cable to the lever pin, wherein the attachment assembly includes
    an outer frame,
    an inner frame disposed at least partially within the outer frame and adjustable in an axial direction relative to the outer frame, wherein the inner frame includes a spring extending within the inner frame, and wherein the inner frame defines a retention block including a retention wall, and
    an attachment block disposed at least partially within the inner frame in engagement with the spring, wherein the attachment block includes a flexible arm that defines a protruding latch, and wherein the attachment block is axially displaceable relative to the inner frame between a disengaged configuration and an engaged configuration;
    wherein the flexible arm defines a lower contact surface adapted to engage the lever pin of the outer manual lever, and wherein in the disengaged configuration, the spring biases the flexible arm into contact with the retention block such that the latch is disposed at a first side of the retention wall, and wherein in the engaged configuration, the attachment block is axially displaced in a direction of the retention block such that the latch is disposed at a second side of the retention wall opposite the first side.

2. The vehicle of claim 1, wherein engagement of the lever pin with the lower contact surface effects displacement of the flexible arm in a direction orthogonal to the axial direction.

3. The vehicle of claim 1, wherein the attachment block includes a bottom wall defining a retention slot, and wherein in the engaged configuration, at least a portion of the lever pin engages the retention slot.

4. The vehicle of claim 3, wherein the retention slot is a U-shaped retention slot, and wherein in the engaged configuration, the U-shaped retention slot is adapted to engage at least 25% of an outer perimeter of a cross-section of a neck portion of the lever pin.

5. The vehicle of claim 4, wherein the lever pin includes a head portion having a greater diameter than the neck portion, and wherein in the engaged configuration, the head portion is disposed between the bottom wall of the attachment block and the flexible arm of the attachment block.

6. The vehicle of claim 1, wherein the retention block defines an engagement wall, and wherein a head portion of the lever pin engages the engagement wall in the engaged configuration.

7. The vehicle of claim 6, wherein the engagement wall defines a geometry complementary to a geometry of the head portion of the lever pin.

8. A method for securing a transmission shifter cable, comprising:
    at an attachment assembly, axially displacing an inner frame relative to an outer frame;
    contacting an attachment block disposed within the inner frame with a transmission lever to deflect an attachment block arm; and
    in response, axially displacing the attachment block from a first axial position to a second axial position to engage the transmission lever and to lock the inner frame to the outer frame, wherein contacting the attachment block includes contacting a lower contact surface of a flexible arm of the attachment block with a head portion of a pin of the transmission lever to deflect the flexible arm in a first direction orthogonal to the axial displacement of the attachment block.

9. The method of claim 8, wherein axially displacing the inner frame includes displacing at least one protrusion disposed on at least one arm of the inner frame relative to at least one depression formed in an inner wall of the outer frame.

10. The method of claim 9, wherein axially displacing the attachment block to the second axial position engages the attachment block with the at least one arm to lock the inner frame to the outer frame.

11. The method of claim 8, wherein in response to axially displacing the attachment block to the second axial position, the flexible arm is adapted to retract in a second direction opposite the first direction.

12. The method of claim 8, wherein axially displacing the attachment block includes, at a spring disposed between the inner frame and the attachment block, biasing the attachment block to axially displace the attachment block.

13. A transmission cable attachment, comprising:
    an outer frame including a retention block defining a retention wall;

an inner frame at least partially within and axially-movable relative to the outer frame; and an attachment block at least partially within and axially-movable relative to the inner frame to engage the retention wall with a latch of a flexible arm of the attachment block to inhibit axial movement of the inner frame relative to the outer frame.

14. The transmission cable attachment of claim 13, wherein the inner frame further includes a guide pin extending from an inner wall of the inner frame, and wherein the attachment assembly further includes a spring disposed about the guide pin between the inner wall and the attachment block to bias the attachment block in an axial direction.

15. The transmission cable attachment of claim 14, wherein the attachment block includes an aperture disposed through a rear wall of the attachment block, and wherein the guide pin is disposed through the aperture.

16. The transmission cable attachment of claim 13, wherein the attachment block includes at least one side rail, wherein an inner wall of the inner frame includes at least one side guide, and wherein the at least one side guide is adapted to receive the at least one side rail to permit movement of the attachment block in an axial direction.

17. The transmission cable attachment of claim 13, wherein the inner frame includes at least one arm having at least one protrusion extending therefrom, wherein the outer frame includes at least one inner wall defining at least one depression formed therein, and wherein the at least one depression is adapted to receive the at least one protrusion.

\* \* \* \* \*